United States Patent
Scheible et al.

(10) Patent No.: US 6,937,130 B2
(45) Date of Patent: Aug. 30, 2005

(54) MAGNETIC FIELD PRODUCTION SYSTEM, AND CONFIGURATION FOR WIRE-FREE SUPPLY OF A LARGE NUMBER OF SENSORS AND/OR ACTUATORS USING A MAGNETIC FIELD PRODUCTION SYSTEM

(75) Inventors: Guntram Scheible, Hirschberg (DE); Jean Schutz, Heidelberg (DE); Carsten Oberschmidt, Rödinghausen (DE)

(73) Assignee: ABB Research Ltd., Zurich (CH)

( * ) Notice: Subject to any disclaimer, the term of this patent is extended or adjusted under 35 U.S.C. 154(b) by 392 days.

(21) Appl. No.: 10/244,807

(22) Filed: Sep. 16, 2002

(65) Prior Publication Data

US 2003/0062794 A1 Apr. 3, 2003

(30) Foreign Application Priority Data

Sep. 15, 2001 (DE) .......................... 101 45 636
Mar. 5, 2002 (DE) .......................... 102 09 656

(51) Int. Cl.[7] .............................................. H01F 27/24
(52) U.S. Cl. .................. 336/212; 336/213; 336/214; 336/221; 336/188; 324/246; 324/253; 323/44; 323/56
(58) Field of Search ................................. 336/212, 213, 336/214, 21, 188, 83, 223; 324/246, 253; 323/44, 56, 48–50; 234/170

(56) References Cited

U.S. PATENT DOCUMENTS 4,210,859 A * 7/1980 Meretsky et al. .......... 323/331
4,825,166 A * 4/1989 MacGugan .................. 324/346
5,270,648 A * 12/1993 Watson ....................... 324/253
5,329,269 A * 7/1994 Watson ....................... 336/213

FOREIGN PATENT DOCUMENTS

| DE | 39 22 556 C3 | 1/1991 |
| DE | 199 26 562 A1 | 12/2000 |
| DE | 199 26 799 A1 | 12/2000 |

* cited by examiner

*Primary Examiner*—Lincoln Donovan
*Assistant Examiner*—Jennifer A. Poker
(74) *Attorney, Agent, or Firm*—Laurence A. Greenberg; Werner H. Stemer; Ralph E. Locher

(57) ABSTRACT

A magnetic field production system is proposed and has a two-dimensional winding configuration with two windings. The windings are disposed essentially orthogonally with respect to one another and enclose a machine or system. The windings have winding axes that are essentially at right angles to one another, and which are supplied with alternating variables via two feed circuits. In order to produce a two-dimensional, rotating magnetic field, the two alternating variables are at the same frequency, have similar current amplitudes and similar voltage amplitudes, and are synchronized to one another. A phase shift of preferably 90° is set between the alternating variable of the first feed circuit and the alternating variable of the second feed circuit. Furthermore, a three-dimensional magnetic field, as well as an configuration for wire-free supply of a large number of sensors and/or actuators using a magnetic field production system are possible.

3 Claims, 3 Drawing Sheets

MAGNETIC FIELD PRODUCTION SYSTEM, AND CONFIGURATION FOR WIRE-FREE SUPPLY OF A LARGE NUMBER OF SENSORS AND/OR ACTUATORS USING A MAGNETIC FIELD PRODUCTION SYSTEM

BACKGROUND OF THE INVENTION

Field of the Invention

The invention relates to a magnetic field production system having a multi-dimensional winding configuration with multiple windings disposed substantially orthogonally with respect to one another and enclose a machine or system. The winding axes are substantially at right angles to on another and the windings receive alternating variables provided by feed circuits. A configuration for a wire-free supply of a large number of sensors and/or actuators using a magnetic field production system is also disclosed. The invention may be used, in particular, for producing a magnetic field, which is used for supplying power to sensors and/or actuators from this magnetic field.

German Patent DE 39 22 556 C3 discloses a configuration for non-contacting power and sensor signal transmission using an RF transmitter in order to form an unmodulated magnetic radio-frequency field around a transmission coil, in which a transponder receives the radio-frequency magnetic field via a secondary winding, and uses it for its own power supply. The sensor and transponder are supplied with the energy which is obtained from the magnetic field.

In this case, the magnetic field produced is greatly attenuated by screens such as large-area metal plates or closed loops formed by metal rails (for example frame parts), so that there is no satisfactory guarantee of power being supplied reliably, particularly in the case of moving sensors/actuators.

SUMMARY OF THE INVENTION

It is accordingly an object of the invention to provide a magnetic field production system, and a configuration for a wire-free supply of a large number of sensors and/or actuators using the magnetic field production system which overcomes the above-mentioned disadvantages of the prior art devices of this general type, which ensures adequate magnetic field production even in poor conditions.

With the foregoing and other objects in view there is provided, in accordance with the invention, a magnetic field production system. The system contains a device being either a machine or a system, and a two-dimensional winding configuration having two windings disposed substantially orthogonally with respect to one another and enclosing the device. The two windings have winding axes disposed substantially at right angles to one another. Two feed circuits are connected to the two windings and supply alternating variables to the two windings. The two feed circuits include a first feed circuit outputting a first alternating variable and a second feed circuit outputting a second alternating variable. The first alternating variable and the second alternating variable have equivalent frequencies, similar current amplitudes, similar voltage amplitudes, and are synchronized to one another. The first alternating variable has a phase shift with respect to the second alternating variable.

Furthermore, a configuration is specified for wire-free supply of a large number of sensors and/or actuators using a magnetic field production system.

The advantages which can be achieved by the invention are, in particular, that a rotating magnetic field is produced and that the universal alignment of the rotating magnetic field impedes the effects of screens, or at least greatly reduces them, which effects greatly attenuate the energy received by the secondary windings of sensors/actuators from the magnetic field.

The proposed method for producing a rotating magnetic field is particularly suitable for a configuration, as proposed in Published, Non-Prosecuted German Patent Application DE 199 26 799 A1, corresponding to U.S. patent application Ser. No. 10/014,000, for a wire-free supply of a large number of sensors with electrical power using a number of primary windings (primary coils, transmission coils) which are fed from a medium-frequency oscillator, with each sensor having at least one secondary winding (secondary coil, receiving coil) which is suitable for receiving energy from a medium-frequency magnetic field (in the range from about 15 kHz to about 15 MHz). The advantage of the universal alignment of the rotating magnetic field that is produced is particularly significant for sensors (proximity sensors) which are mounted on moving machine components.

The proposed method for producing a rotating magnetic field is, furthermore, most suitable for a configuration, as proposed in Published, Non-Prosecuted German Patent Application DE 199 26 562 A1, for supplying electrical power without the use of wires to a large number of actuators, with a magnetic field that is produced and likewise being used for power transmission.

In accordance with an added feature of the invention, the phase shift is 90°.

With the foregoing and other objects in view there is provided, in accordance with the invention, a magnetic field production system. The system contains a device being either a machine or a system, and a three-dimensional winding configuration having three windings disposed substantially orthogonally with respect to one another and enclosing the device. The three windings have winding axes disposed substantially at right angles to one another. Three feed circuits are connected to the three windings and supply variables to the windings. The three feed circuits include a first feed circuit outputting a first alternating variable, a second feed circuit outputting a second alternating variable, and a third feed circuit outputting a third alternating variable. The first, second and third alternating variables have an equivalent first frequency, similar current amplitudes, and are synchronized to one another. The first alternating variable has a phase shift with respect to the second and third alternating variables, and the current amplitudes of the second and third alternating variables are modulated at a second frequency.

In accordance with an additional feature of the invention, the alternating variables of the feed circuits are connected successively to the three windings at a third frequency.

With the foregoing and other objects in view there is provided, in accordance with the invention, a magnetic field production system. The system contains a device being either a machine or a system, and a three-dimensional winding configuration having three windings disposed substantially orthogonally with respect to one another and enclosing the device. The three windings have winding axes disposed substantially at right angles to one another. The three windings include a first winding, a second winding and a third winding. Only two feed circuits are coupled to the three windings for supplying alternating variables to the two windings. The two feed circuits include a first feed circuit outputting a first alternating variable and a second feed circuit outputting a second alternating variable. The first alternating variable and the second alternating variable have an equivalent first frequency, similar current amplitudes, similar voltage amplitudes, and are synchronized to one another. The first alternating variable has a phase shift with respect to the second alternating variable. The first alternating variable is applied to the first winding. The second alternating variable is applied alternately, on each current zero crossing, to the second and third windings.

With the foregoing and other objects in view there is provided, in accordance with the invention, a wire-free supply configuration. The configuration contains a magnetic field production system having a three-dimensional winding configuration with three windings disposed substantially orthogonally with respect to one another. The three windings have winding axes disposed substantially at right angles to one another. Three feed circuits are connected to the three windings and supply alternating variables to the windings. The three feed circuits include a first feed circuit outputting a first alternating variable, a second feed circuit outputting a second alternating variable, and a third feed circuit outputting a third alternating variable. The first, second and third alternating variables have an equivalent first frequency, similar current amplitudes, and are synchronized to one another. The first alternating variable has a phase shift with respect to the second and third alternating variables, and the current amplitudes of the second and third alternating variables are modulated with a second frequency. Resonance capacitors are each connected between one of the three windings and one of the feed circuits for forming resonant circuits. The three windings supplied by the feed circuits operate at resonance. Apparatuses including sensors and/or actuators are provided. The apparatuses each contain a load and a further three-dimensional winding configuration. The further three-dimensional winding configuration has further windings and resonance capacitors each connected to one of the further windings for forming resonant circuits. The further three-dimensional winding configuration has rectifiers each connected to one of the resonant circuits and the load. The rectifiers have direct current connections connected in series or in parallel for supplying the load.

Other features which are considered as characteristic for the invention are set forth in the appended claims.

Although the invention is illustrated and described herein as embodied in a magnetic field production system, and a configuration for a wire-free supply of a large number of sensors and/or actuators using the magnetic field production system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
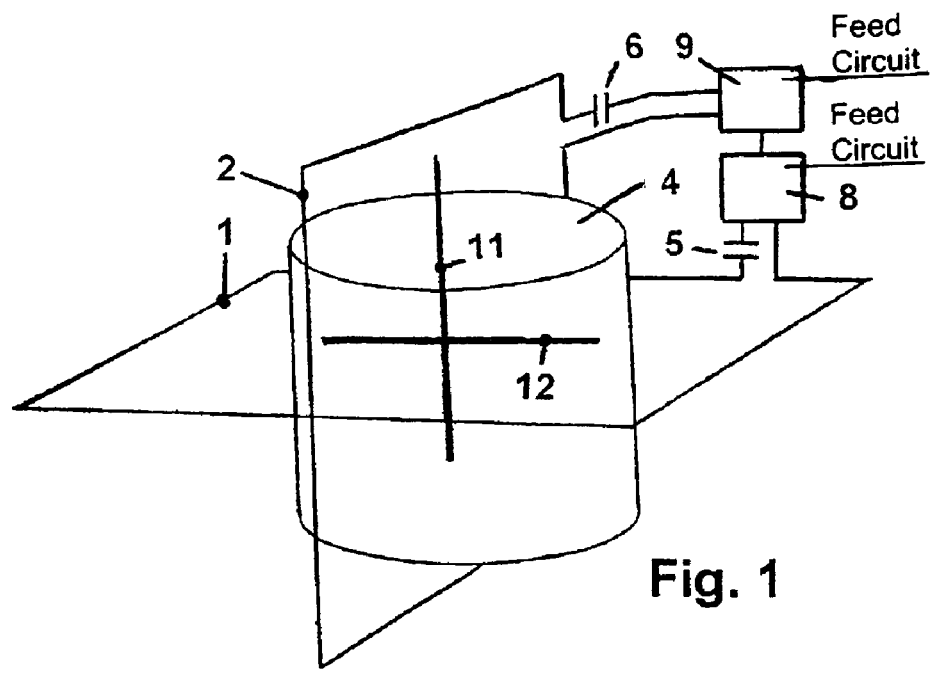
FIG. 1 is a diagrammatic, perspective view of a two-dimensionally rotating magnetic field according to the invention.

Referring now to the figures of the drawing in detail and first, particularly, to FIG. 1 thereof, there is shown a configuration for forming a two-dimensionally rotating magnetic field. According to a first embodiment, the two-dimensional winding configuration has two windings 1, 2, which are disposed orthogonally with respect to one another and surround a machine or system 4, that is to say a winding axis 11 of the first winding 1 is at right angles to a winding axis 12 of the second winding 2. The windings 1 and 2, respectively, are generally connected to respective resonance capacitors 5 and 6 to form resonant circuits, which are supplied by respective feed circuits 8 and 9 (which are operated at resonance) that can (in consequence) be configured for a minimal power level. The alternating variables which are formed by the two feed circuits 8, 9 are at the same frequency $f_1$ and in general have similar—preferably identical—current and voltage amplitudes, and are synchronized to one another, with a phase shift of preferably 90° being set between the two alternating variables.

Figure 2:
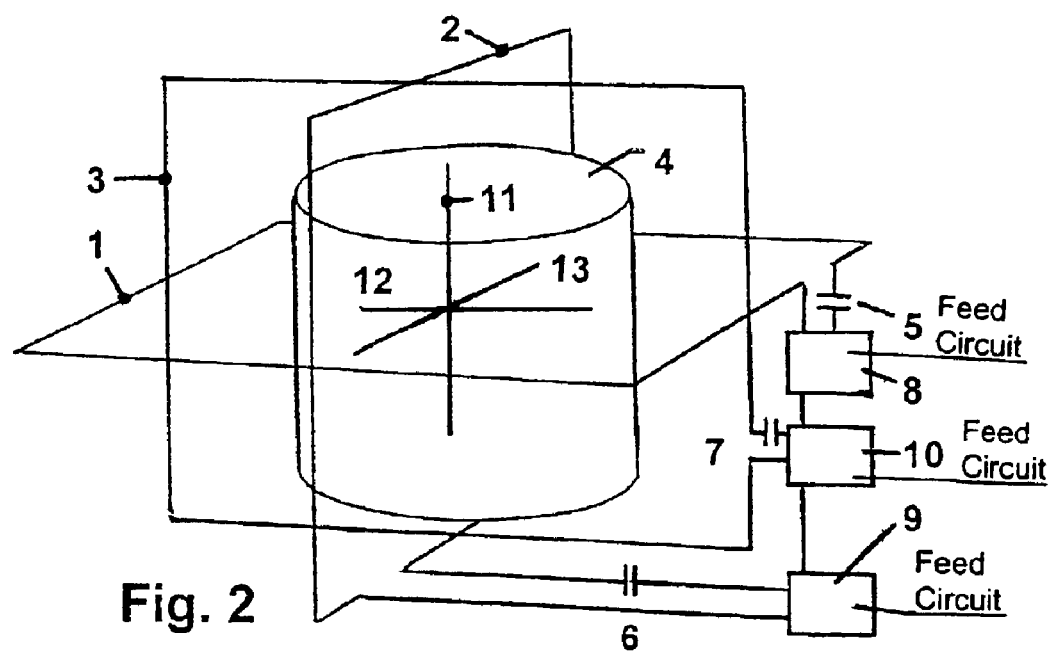
FIG. 2 is a diagrammatic, perspective view of a three-dimensionally rotating magnetic field.

FIG. 2 shows a configuration for forming a three-dimensionally rotating magnetic field. According to the second embodiment, the three-dimensional winding configuration has three windings 1, 2, 3 which are disposed orthogonally with respect to one another and surround the machine or system 4, that is to say the winding axis 11 of the first winding 1, the winding axis 12 of the second winding 2 and a winding axis 13 of the third winding 3 are at right angles to one another. The respective windings 1, 2 and 3 are connected to respective resonance capacitors 5, 6 and 7 to form resonant circuits.

According to a first variant of the second embodiment, the resonant circuits are supplied by feed circuits 8, 9 and 10, respectively. The alternating variables which are formed by the feed circuits 8, 9, 10 are at the same frequency $f_1$ and have similar, preferably identical, current amplitudes, and are synchronized to one another, with a phase shift of preferably 90° being set between the alternating variable of the feed circuit 8 and of the winding 1 on the one hand, and the alternating variables of the feed circuits 9, 10, and of the windings 2, 3, on the other hand. The feed circuits 9, 10 amplitude-modulate the current which is fed to the second and third windings 2, 3, at a frequency $f_2<f_1$.

Figure 3:
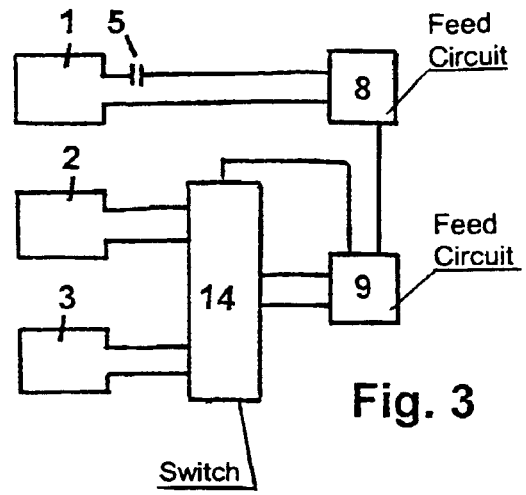
FIGS. 3, 4, 5 are block diagrams of variants of the configuration shown in FIG. 2.
Figure 4:
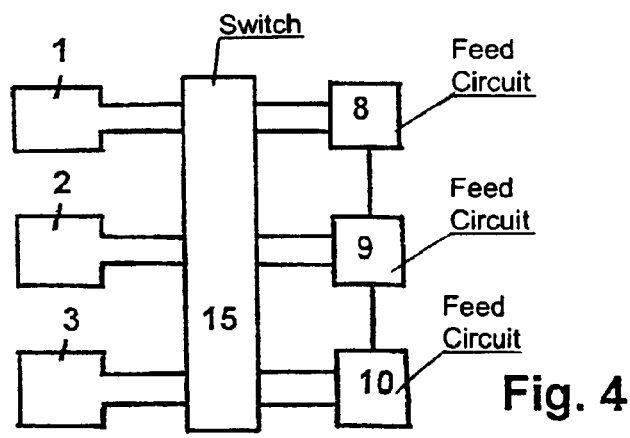
Figure 5:
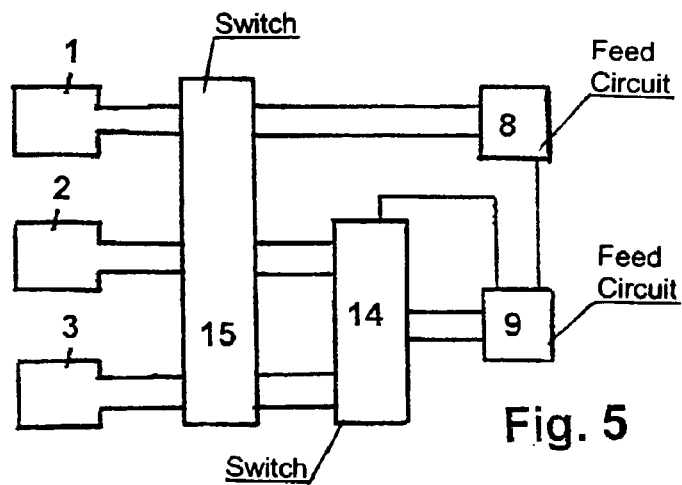

FIGS. 3, 4 and 5 show variants of the embodiment shown in FIG. 2. In a second variant of the second embodiment, which is shown in FIG. 3, only two feed circuits 8, 9 are required. The alternating variables which are formed by the feed circuits 8, 9 are at the same frequency $f_1$ and have similar—preferably identical—current and voltage amplitudes, and are synchronized to one another, with a phase shift of preferably 90° being set between the alternating variable of the feed circuit 8 and of the winding 1 on the one hand, and the alternating variable of the feed circuit 9 on the other hand. The feed circuit 9 feeds a switching device 14, whose output side is connected to the windings 2, 3. The switching device 14 preferably contains the required resonance capacitors, and connects the alternating variable which is formed by the feed circuit 9 alternately to the two windings 2, 3, at each current zero crossing, and at the frequency $f_1$.

In a third variant of the second embodiment, which is shown in FIG. 4, the three windings 1, 2, 3 are connected to the feed circuits 8, 9, 10 via an intermediate switching device 15. The switching device 15 preferably contains the required resonance capacitors. The alternating variables which are formed by the feed circuits 8, 9, 10 are connected successively to the windings 1, 2, 3 at a predetermined frequency $f_3$, thus avoiding the rotating magnetic field which is formed having a specific preferred direction, that is to say the three-dimensional magnetic field which is formed is distributed symmetrically.

The fourth variant of the second embodiment, which is shown in FIG. 5, is a combination of the exemplary embodiments explained with reference to FIGS. 3 and 4, that is to say a switching device 15—preferably with the required resonance capacitors—is provided, whose output side feeds the three windings 1, 2, 3 and to whose input side the feed circuit 8 and the switching device 14 are connected, with the switching device 14 being supplied from the feed circuit 9.

Figure 6:
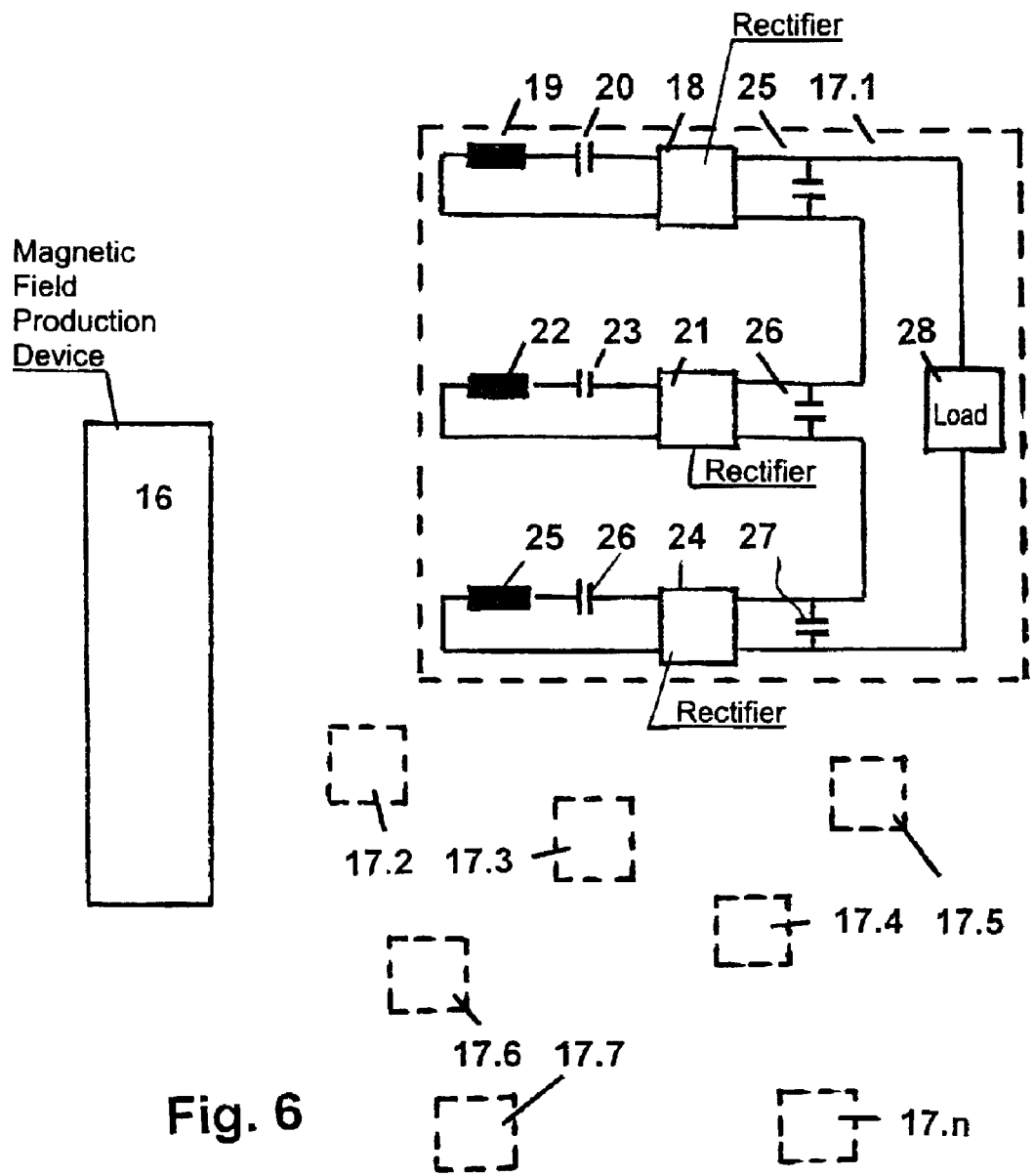
FIG. 6 is a block diagram of a configuration for a wire-free supply of a large number of sensors and/or actuators.

FIG. 6 shows a configuration for a wire-free supply of a large number of sensors and/or actuators. A magnetic field production device 16 can be seen, which has a two-dimensional or three-dimensional winding configuration with, respectively, two or three windings which are disposed orthogonally with respect to one another (with the windings being connected to resonance capacitors to form resonant circuits), which are supplied by feed circuits in order to produce such a two-dimensionally or three-dimensionally rotating magnetic field, as explained above (see the exemplary embodiments according to FIGS. 1 to 5, above). The magnetic field production device 16 is used for supplying electrical power without the use of wires to a large number of sensors and/or actuators 17.1, 17.2, 17.3 . . . 17.$n$ ($n$=any desired positive integer).

FIG. 6 shows, by way of example for a sensor or actuator 17.1, a configuration for producing electrical energy from a magnetic field which is produced by the magnetic field production device 16. A rectifier 18 can be seen, whose alternating current connections are connected to a series of circuits formed by a winding 19 and a resonance capacitor 20 (series resonant circuit). In the same way, the series circuit formed by a winding 22 with a resonance capacitor 23 is connected to the alternating current connections of a rectifier 21, and the series circuit formed by a winding 25 and a resonance capacitor 26 is connected to the alternating current connections of a rectifier 24. The winding axes of the three windings 19, 22, 25 are each disposed at right angles to one another, and intersect at a central point of a core, which is formed from a magnetic material, of the three-dimensional winding configuration (embodiment variants without a core are, of course, also feasible as an alternative).

The rectifiers 18, 21, 24 are each in the form of bridge circuits, using four semiconductor components (bridge rectifiers). An energy storage capacitor 25, 26 or 27, respectively, is disposed between the direct current connections of each rectifier 18, 21 or 24. The direct current connections of all the rectifiers 18, 21, 24 are connected in series with a load 28, for example a sensor measurement unit plus sensor electronics or a drive unit for an actuator.

Other embodiments for producing electrical power from a magnetic field may, of course, also be used for the sensors and/or actuators 17.1 . . . 17.$n$, and for this purpose express reference is made to the variants explained in FIGS. 4, 5, 6 and 8 of Published, Non-Prosecuted German Patent Application DE 100 55 404 A1, which relate to series resonant circuits, parallel resonant circuits, rectifier direct current connections connected in series, rectifier direct current connections connected in parallel, and windings used as transformers.

We claim:

1. A magnetic field production system, comprising:
    a device selected from the group consisting of a machine and a system;
    a two-dimensional winding configuration having two windings disposed substantially orthogonally with respect to one another and enclosing said device, said two windings having winding axes disposed substantially at right angles to one another; and
    two feed circuits connected to said two windings and supplying alternating variables to said two windings, said two feed circuits include a first feed circuit outputting a first alternating variable and a second feed circuit outputting a second alternating variable, the first alternating variable and the second alternating variable having equivalent frequencies, similar current amplitudes, similar voltage amplitudes, and being synchronized to one another, the first alternating variable having a phase shift with respect to the second alternating variable.

2. The magnetic field production system according to claim 1, wherein the phase shift is 90°.

3. A wire-free supply configuration, comprising:
    a magnetic field production system, including:
        a two-dimensional winding configuration having two windings disposed substantially orthogonally with respect to one another, said two windings having winding axes disposed substantially at right angles to one another;
        two feed circuits connected to said two windings and supplying alternating variables to said windings, said two feed circuits include a first feed circuit outputting a first alternating variable, and a second feed circuit outputting a second alternating variable, the first and second alternating variables have an equivalent first frequency, similar current amplitudes, and being synchronized to one another, the first alternating variable having a phase shift with respect to the second alternating variable; and
        resonance capacitors each connected between one of said two windings and one of said feed circuits for forming resonant circuits, said two windings supplied by said feed circuits operating at resonance; and
    apparatuses selected from the group consisting of sensors and actuators, said apparatuses each containing a load and a further three-dimensional winding configuration, the further three-dimensional winding configuration having further windings and resonance capacitors each connected to one of said further windings for forming resonant circuits, said further three-dimensional winding configuration having rectifiers each connected to one of said resonant circuits and said load, said rectifiers having direct current connections connected one of in series and in parallel for supplying said load.

* * * * *